US012632756B2

(12) United States Patent
Wang et al.

(10) Patent No.: US 12,632,756 B2
(45) Date of Patent: May 19, 2026

(54) EFFICIENT QUANTUM SIMULATION WITH QUANTUM INFORMATION COMPRESSION AND MULTIPLE FERMION-TO-QUBIT BASIS TRANSFORMATIONS

(71) Applicants: IONQ, INC., College Park, MD (US); University of Maryland, College Park, MD (US)

(72) Inventors: Qingfeng Wang, College Park, MD (US); Yunseong Nam, North Bethesda, MD (US)

(73) Assignees: IONQ, INC., College Park, MD (US); UNIVERSITY OF MARYLAND, College Park, MD (US)

( * ) Notice: Subject to any disclaimer, the term of this patent is extended or adjusted under 35 U.S.C. 154(b) by 980 days.

(21) Appl. No.: 17/863,787

(22) Filed: Jul. 13, 2022

(65) Prior Publication Data

US 2023/0042892 A1     Feb. 9, 2023

Related U.S. Application Data

(60) Provisional application No. 63/221,717, filed on Jul. 14, 2021.

(51) Int. Cl.
*G06N 10/20*          (2022.01)
*G06N 10/40*          (2022.01)

(52) U.S. Cl.
CPC ............. *G06N 10/20* (2022.01); *G06N 10/40* (2022.01)

(58) Field of Classification Search
CPC .............................. G06N 10/20; G06N 10/40
See application file for complete search history.

(56) References Cited

U.S. PATENT DOCUMENTS

| | | | | | |
|---|---|---|---|---|---|
| 10,637,480 | B1 * | 4/2020 | Hu | ......................... | G06N 10/70 |
| 10,776,544 | B2 * | 9/2020 | Delaney | ................. | G06N 10/20 |
| 2020/0184024 | A1 | 6/2020 | Nam et al. | | |
| 2021/0264309 | A1 | 8/2021 | Wang et al. | | |
| 2021/0374550 | A1 * | 12/2021 | Cao | ......................... | G06N 10/60 |

OTHER PUBLICATIONS

Boyyajian et al, Matchgate circuits and compressed quantum computation, pp. 1-187, 2015 (Year: 2015).*
Y. Nam, J. Chen, N. Pisenti, K. Wright, C. Delaney, D. Maslov, K. R. Brown, S. Allen, J. M. Amini, J. Apisdorf, K. M. Beck, A. Blinov, V. Chaplin, M. Chmielewski, . . . "Ground-state energy estimation of the water molecule on a trapped-ion quantum computer" pp. 1-6 , (Year: 2020).*
"PSI41.1:An Open-Source Electronic Structure Program Emphasizing Automation, Advanced Libraries, and Interoperability" R. M. Parrish, L. A. Bums, D. G.A. Smith, A. C. Simmonett, A. E. DePrince, E. G. Hohenstein, U.Bozkaya,A.Y.Sokolov,R.D.Remigio,R. M.Richard,J.F.Gonthier,A.M.James . . . pp. A-M, (Year: 2017).*
(Continued)

*Primary Examiner* — Kibrom K Gebresilassie
(74) *Attorney, Agent, or Firm* — Patterson + Sheridan, LLP

(57)          ABSTRACT

Aspects of the present disclosure describe a method including compressing and uncompressing redundant quantum information encoded in quantum computers; processing quantum information in the compressed space; and computing, in response to determining the ansatz terms, a set of optimal transformations.

20 Claims, 5 Drawing Sheets

900

Compute, by a processor, quantum circuits that implement one-body Trotter terms and two-body Trotter terms of a time evolution operator of a Fermionic system to be simulated, on a plurality of qubits — 910

Compress, by the processor, a quantum circuit that implements a two-body Trotter term on a first qubit, a second qubit, a third qubit, and a fourth qubit in a selected state, wherein in the selected state, the first and second qubits are in the same qubit state, and the third and fourth qubits are in the same qubit state — 920

Implement, by an optical controller, the computed quantum circuits on the plurality of qubits — 930

Measure, by an imaging system, a qubit state of each of the plurality of qubits — 940

Output, by the processor, an indication of the measured states of the plurality of qubits, the indication illustrating a time evolution of the Fermionic system. — 950

(56) References Cited

OTHER PUBLICATIONS

Rodney J. Bartlett, Stanislaw A. Kucharski, and Jozef Noga. Alternative coupled-cluster ansätze ii. the unitary coupled-cluster method. Chemical Physics Letters, 155 (1): 133-140, 1989.

Mark R. Hoffmann and Jack Simons. A unitary multiconfigurational coupled cluster method: Theory and applications. The Journal of Chemical Physics, 88 (2): 993-1002, 1988.

James Kennedy and Russell C Eberhart. A discrete binary version of the particle swarm algorithm. In 1997 IEEE International conference on systems, man, and cybernetics. Computational cybernetics and simulation, vol. 5, pp. 4104-4108. IEEE, 1997.

Ryan Babbush, Jarrod McClean, Dave Wecker, Alan Aspuru-Guzik, and Nathan Wiebe. Chemical basis of trotter-suzuki errors in quantum chemistry simulation. Physical Review A, 91 (2), Feb. 2015.

Dominic W. Berry, Graeme Ahokas, Richard Cleve, and Barry C. Sanders. Efficient quantum algorithms for simulating sparse hamiltonians. Communications in Mathematical Physics, 270 (2): 359-371, 2007.

Alex Bocharov, Martin Roetteler, and Krysta M. Svore. Efficient synthesis of universal repeat-until-success quantum circuits. Physical Review Letters, 114: 080502, Feb. 2015.

Sergey B. Bravyi and Alexei Yu. Kitaev. Fermionic quantum computation. Annals of Physics, 298 (1):210-226, 2002.

Andrew M. Childs, Dmitri Maslov, Yunseong Nam, Neil J. Ross, and Yuan Su. Toward the first quantum simulation with quantum speedup. Proceedings of the National Academy of Sciences, 115 (38): 9456-9461, 2018. ISSN 0027-8424.

J. I. Cirac and P. Zoller. Quantum computations with cold trapped ions. Physical Review Letters, 74: 4091-4094, May 1995.

E. F. Dumitrescu, A. J. McCaskey, G. Hagen, G. R. Jansen, T. D. Morris, T. Papenbrock, R. C. Pooser, D. J. Dean, and P. Lougovski. Cloud quantum computing of an atomic nucleus. Physical Review Letters, 120: 210501, May 2018.

Richard P. Feynman. Simulating physics with computers. International Journal of Theoretical Physics, 21 (6): 467-488, 1982. ISSN 1572-9575.

Craig Gidney. Halving the cost of quantum addition. Quantum, 2: 74, Jun. 2018. ISSN 2521-327X.

Pranav Gokhale, Olivia Angiuli, Yongshan Ding, Kaiwen Gui, Teague Tomesh, Martin Suchara, Margaret Martonosi, and Frederic T Chong. Minimizing state preparations in variational quantum eigensolver by partitioning into commuting families. arXiv preprint arXiv:1907.13623, 2019.

Harper R. Grimsley, Sophia E. Economou, Edwin Barnes, and Nicholas J. Mayhall. An adaptive variational algorithm for exact molecular simulations on a quantum computer. Nature Communications, 10 (1): 3007, Jul. 2019. ISSN 2041-1723.

Matthew B. Hastings, Dave Wecker, Bela Bauer, and Matthias Troyer. Improving quantum algorithms for quantum chemistry. Quantum Info. Comput., 15 (1-2): 1-21, Jan. 2015. ISSN 1533-7146.

Cornelius Hempel, Christine Maier, Jonathan Romero, Jarrod McClean, Thomas Monz, Heng Shen, Petar Jurcevic, Ben P. Lanyon, Peter Love, Ryan Babbush, Alan Aspuru-Guzik, Rainer Blatt, and Christian F. Roos. Quantum chemistry calculations on a trapped-ion quantum simulator. Physical Review X, 8: 031022, Jul. 2018.

Zhang Jiang, Kevin J. Sung, Kostyantyn Kechedzhi, Vadim N. Smelyanskiy, and Sergio Boixo. Quantum algorithms to simulate many-body physics of correlated fermions. Physical Review Applied, 9 (4), Apr. 2018.

Abhinav Kandala, Antonio Mezzacapo, Kristan Temme, Maika Takita, Markus Brink, Jerry M. Chow, and Jay M. Gambetta. Hardware-efficient variational quantum eigensolver for small molecules and quantum magnets. Nature, 549(7671): 242-246, 2017.

Ian D. Kivlichan, Craig Gidney, Dominic W. Berry, Nathan Wiebe, Jarrod McClean, Wei Sun, Zhang Jiang, Nicholas Rubin, Austin Fowler, Alan Aspuru-Guzik, and et al. Improved fault-tolerant quantum simulation of condensed-phase correlated electrons via trotterization. Quantum, 4: 296, Jul. 2020.

Joonho Lee, William J. Huggins, Martin Head-Gordon, and K. Birgitta Whaley. Generalized unitary coupled cluster wave functions for quantum computation. Journal of Chemical Theory and Computation, 15 (1): 311-324, Jan. 2019.

Seth Lloyd. Universal quantum simulators. Science, 273 (5278): 1073-1078, 1996.

Guang Hao Low and Isaac L. Chuang. Optimal hamiltonian simulation by quantum signal processing. Physical Review Letters, 118: 010501, Jan. 2017.

Guang Hao Low and Isaac L. Chuang. Hamiltonian Simulation by Qubitization. Quantum, 3: 163, Jul. 2019.

D. Maslov, Y. Nam, and J. Kim. An outlook for quantum computing [point of view]. Proceedings of the IEEE, 107 (1): 5-10, Jan. 2019.

Dmitri Maslov. Advantages of using relative-phase toffoli gates with an application to multiple control toffoli optimization. Physical Review A, 93: 022311, Feb. 2016.

Dmitri Maslov and Yunseong Nam. Use of global interactions in efficient quantum circuit constructions. New Journal of Physics, 20 (3): 033018, Mar. 2018.

Yunseong Nam and Dmitri Maslov. Low-cost quantum circuits for classically intractable instances of the hamiltonian dynamics simulation problem. npj Quantum Information, 5 (1): 44, 2019.

Yunseong Nam, Neil J. Ross, Yuan Su, Andrew M. Childs, and Dmitri Maslov. Automated optimization of large quantum circuits with continuous parameters. npj Quantum Information, 4 (1): 23, 2018.

Yunseong Nam, Yuan Su, and Dmitri Maslov. Approximate quantum fourier transform with o(n log(n)) t gates. npj Quantum Information, 6 (1), Mar. 2020b. ISSN 2056-6387.

P. J. J. O'Malley, R. Babbush, I. D. Kivlichan, J. Romero, J. R. McClean, R. Barends, J. Kelly, P. Roushan, A. Tranter, N. Ding, B. Campbell, Y. Chen, Z. Chen, B. Chiaro, A. Dunsworth, A. G. Fowler, E. Jeffrey, E. Lucero, A. Megrant, J. Y. Mutus, M. Neeley, C. Neill, C. Quintana, D. Sank, A. Vainsencher, J. Wenner, T. C. White, P. V. Coveney, P. J. Love, H. Neven, A. Aspuru-Guzik, and J. M. Martinis. Scalable quantum simulation of molecular energies. Physical Review X, 6: 031007, Jul. 2016.

Ketan N. Patel, Igor L. Markov, and John P. Hayes. Optimal synthesis of linear reversible circuits. Quantum Info. Comput., 8 (3): 282-294, Mar. 2008. ISSN 1533-7146.

Alberto Peruzzo, Jarrod McClean, Peter Shadbolt, Man-Hong Yung, Xiao-Qi Zhou, Peter J. Love, Alan Aspuru-Guzik, and Jeremy L. O'Brien. A variational eigenvalue solver on a photonic quantum processor. Nature Communications, 5 (1): 4213, 2014.

David Poulin, Matthew B. Hastings, Dave Wecker, Nathan Wiebe, Andrew C. Doberty, and Matthias Troyer. The trotter step size required for accurate quantum simulation of quantum chemistry. Quantum Info. Comput., 15 (5-6): 361-384, Apr. 2015.

Markus Reiher, Nathan Wiebe, Krysta M. Svore, Dave Wecker, and Matthias Troyer. Elucidating reaction mechanisms on quantum computers. Proceedings of the National Academy of Sciences, 2017.

Jonathan Romero, Ryan Babbush, Jarrod R McClean, Cornelius Hempel, Peter J Love, and Alan Aspuru-Guzik. Strategies for quantum computing molecular energies using the unitary coupled cluster ansatz. Quantum Science and Technology, 4 (1): 014008, Oct. 2018.

Jacob T. Seeley, Martin J. Richard, and Peter J. Love. The bravyi-kitaev transformation for quantum computation of electronic structure. The Journal of Chemical Physics, 137 (22): 224109, 2012.

O. Shehab, K. Landsman, Y. Nam, D. Zhu, N. M. Linke, M. Keesan, R. C. Pooser, and C. Monroe. Toward convergence of effective-field-theory simulations on digital quantum computers. Physical Review A, 100: 062319, Dec. 2019. 10.1103/?PhysRevA.100. 062319.

Mark Steudtner and Stephanie Wehner. Fermion-to-qubit mappings with varying resource requirements for quantum simulation. New Journal of Physics, 20 (6): 063010, Jun. 2018.

Masuo Suzuki. General theory of fractal path integrals with applications to many?body theories and statistical physics. Journal of Mathematical Physics, 32 (2): 400-407, 1991.

(56)  References Cited

OTHER PUBLICATIONS

Andrew Tranter, Peter J. Love, Florian Mintert, Nathan Wiebe, and Peter V. Coveney. Ordering of trotterization: Impact on errors in quantum simulation of electronic structure. Entropy, 21 (12): 1218, Dec. 2019.

Dave Wecker, Bela Bauer, Bryan K. Clark, Matthew B. Hastings, and Matthias Troyer. Gate-count estimates for performing quantum chemistry on small quantum computers. Physical Review A, 90 (2), Aug. 2014. ISSN 1094-1622. 10.1103/?physreva.90.022305.

James D. Whitfield, Jacob Biamonte, and Alan Aspuru-Guzik. Simulation of electronic structure hamiltonians using quantum computers. Molecular Physics, 109 (5): 735-750, 2011.

Ciyou Zhu, Richard H Byrd, Peihuang Lu, and Jorge Nocedal. Algorithm 778: L-bfgs-b: Fortran subroutines for large-scale bound-constrained optimization. ACM Transactions on mathematical software (TOMS), 23 (4): 550-560, 1997.

* cited by examiner

900

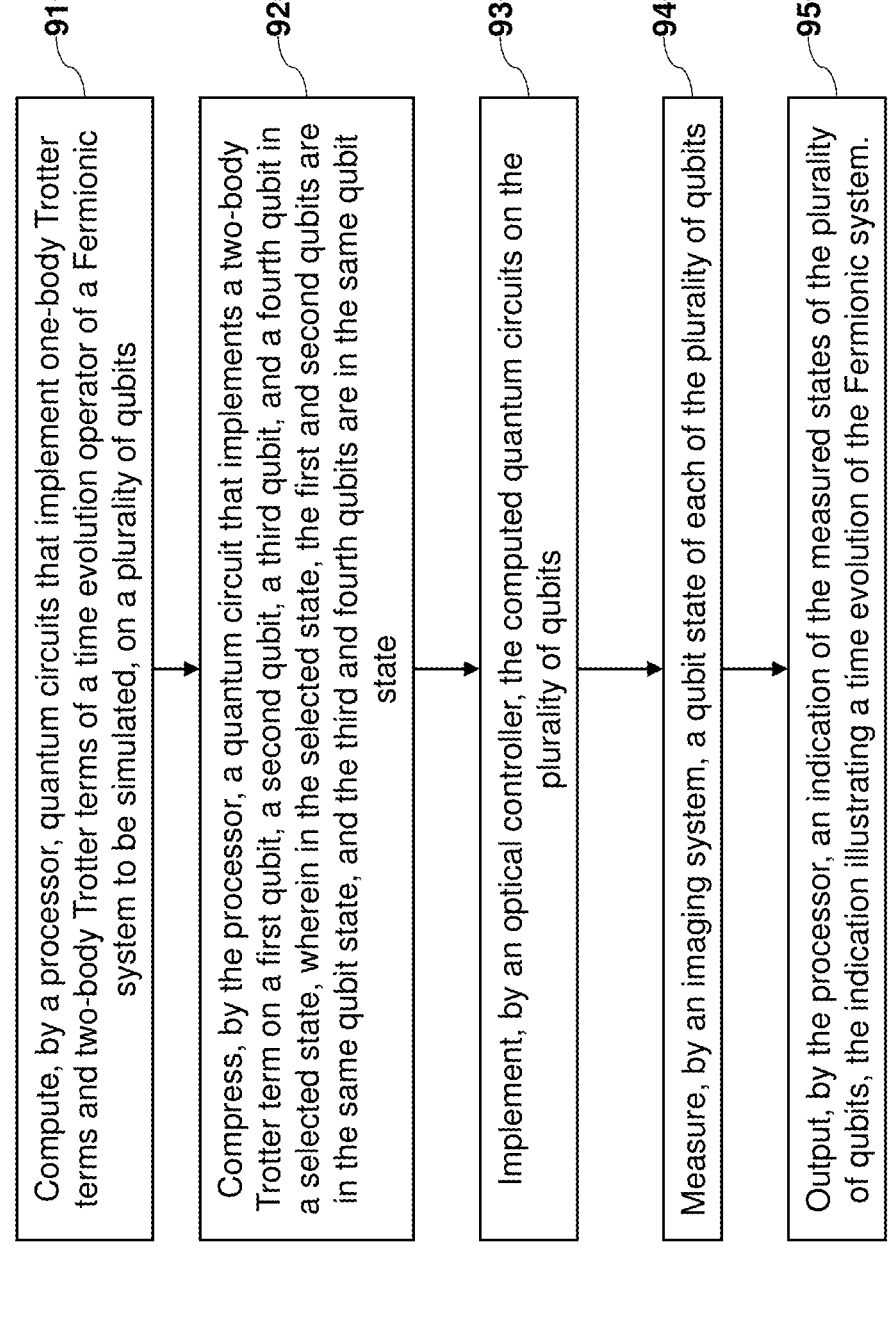

910 — Compute, by a processor, quantum circuits that implement one-body Trotter terms and two-body Trotter terms of a time evolution operator of a Fermionic system to be simulated, on a plurality of qubits 920 — Compress, by the processor, a quantum circuit that implements a two-body Trotter term on a first qubit, a second qubit, a third qubit, and a fourth qubit in a selected state, wherein in the selected state, the first and second qubits are in the same qubit state, and the third and fourth qubits are in the same qubit state 930 — Implement, by an optical controller, the computed quantum circuits on the plurality of qubits 940 — Measure, by an imaging system, a qubit state of each of the plurality of qubits 950 — Output, by the processor, an indication of the measured states of the plurality of qubits, the indication illustrating a time evolution of the Fermionic system.

FIG. 9

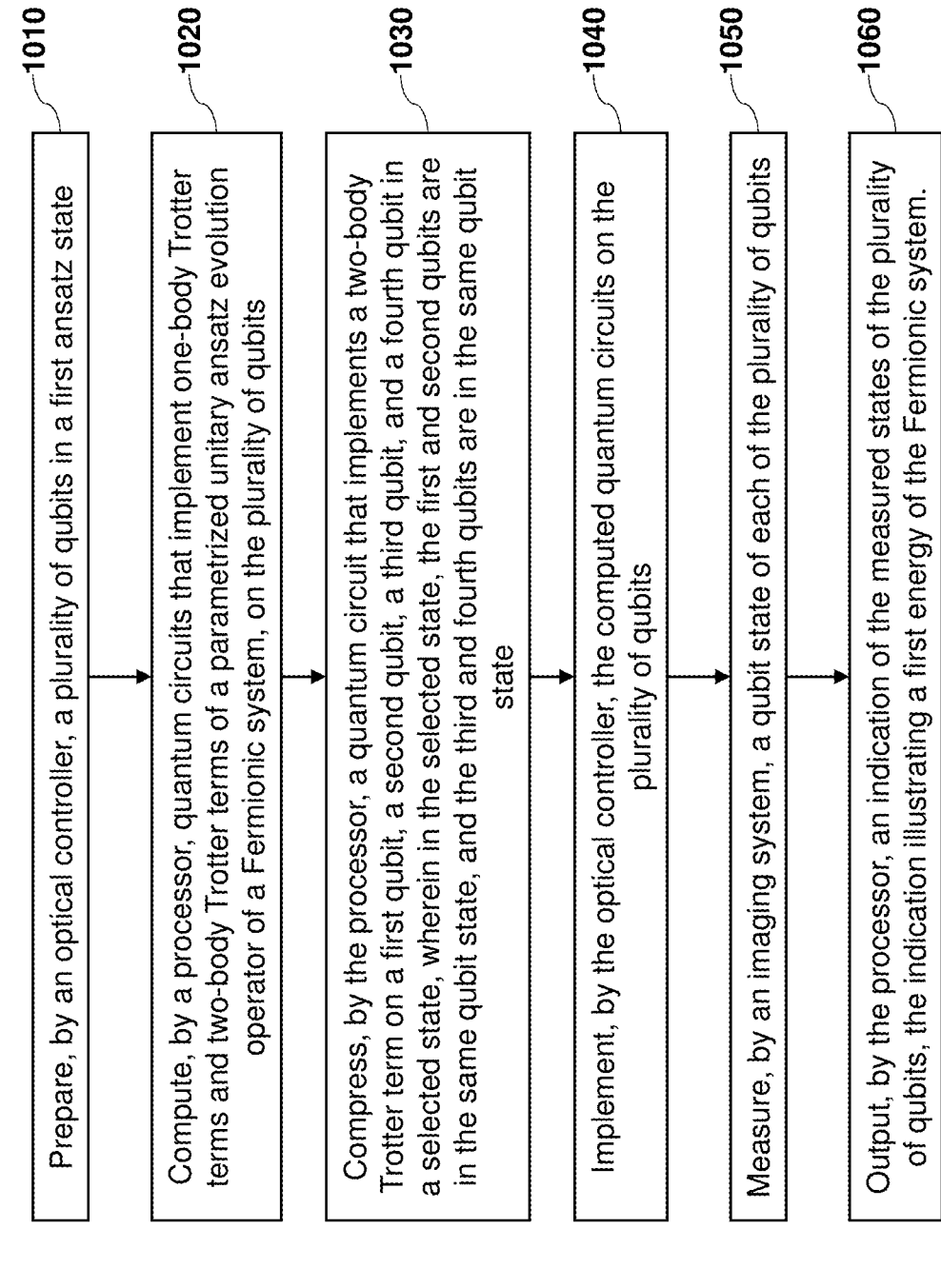

1000

1010 — Prepare, by an optical controller, a plurality of qubits in a first ansatz state 1020 — Compute, by a processor, quantum circuits that implement one-body Trotter terms and two-body Trotter terms of a parametrized unitary ansatz evolution operator of a Fermionic system, on the plurality of qubits 1030 — Compress, by the processor, a quantum circuit that implements a two-body Trotter term on a first qubit, a second qubit, a third qubit, and a fourth qubit in a selected state, wherein in the selected state, the first and second qubits are in the same qubit state, and the third and fourth qubits are in the same qubit state 1040 — Implement, by the optical controller, the computed quantum circuits on the plurality of qubits 1050 — Measure, by an imaging system, a qubit state of each of the plurality of qubits 1060 — Output, by the processor, an indication of the measured states of the plurality of qubits, the indication illustrating a first energy of the Fermionic system.

EFFICIENT QUANTUM SIMULATION WITH QUANTUM INFORMATION COMPRESSION AND MULTIPLE FERMION-TO-QUBIT BASIS TRANSFORMATIONS

CROSS-REFERENCE TO RELATED APPLICATIONS

This application claims the benefit to U.S. Provisional Application No. 63/221,717, filed Jul. 14, 2021, which is incorporated by reference herein.

GOVERNMENT RIGHTS

This invention was made with Government support under W911NF-16-1-0082 awarded by the Army Research Office and PHY1818914 awarded by National Science Foundation. The Government has certain rights in the invention.

BACKGROUND

Field

Aspects of the present disclosure relate generally to improvement of resource utilization in a quantum computer.

Description of the Related Art

An atomic flux may be generated and used as a source of neutral atoms or ions for certain systems. Some of those systems may include quantum information processing (QIP) systems, for example. Trapped ions are one of the leading implementations of QIP systems. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other using suitable external control fields such as optical or microwave fields. These attributes make atomic-based qubits attractive for extended quantum operations such as quantum computations or quantum simulations.

One application for quantum simulations is using QIP systems to simulate Fermionic matters, including Fermions undergoing local interactions. A Fermionic system simulation on a quantum computer may include two approaches: a Hamiltonian dynamics simulation based on quantum simulation algorithms, suitable for a fault-tolerant (FT) quantum computer, and a ground state energy estimation based on variational quantum-classical hybrid strategy, suitable for an imperfect, pre-fault tolerant (pre-FT) quantum computer. The Hamiltonian dynamic simulation leverages the ability of a quantum computer to efficiently simulate quantum systems with a local Hamiltonian, which, combined with quantum phase estimation, allows the evaluation of the ground-state energy of the system. The variational ground-state estimation leverages the efficient preparation of a good ansatz state for the sought-after ground state and the means to evaluate the expectation value of the Hamiltonian of the system for the prepared ansatz state, both enabled by the quantum computer. In the pre-FT regime, the quantum computational cost may be dominated by multi-qubit gates. In contrast, in the FT regime, where the circuit is typically written over the Clifford+T gate-set, the quantum computational cost may be dominated by the

2

$$T := \begin{pmatrix} 1 & 0 \\ 0 & e^{i\pi/4} \end{pmatrix}$$

gates (also referred to as "phase shift gates").

Therefore, improvements in simulating quantum systems may be desirable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure includes a method including compressing and uncompressing redundant quantum information encoded in quantum computers, processing quantum information in the compressed space, and computing, in response to determining the ansatz terms, a set of optimal transformations.

In another aspect of this disclosure includes a quantum computing device configured to perform the steps of compressing and uncompressing redundant quantum information encoded in quantum computers, processing quantum information in the compressed space, and computing, in response to determining the ansatz terms, a set of optimal transformations.

Aspects of the present disclosure include compressing and uncompressing redundant quantum information encoded in quantum computers, processing quantum information in the compressed space, and computing, in response to determining the ansatz terms, a set of optimal transformations.

Embodiments of the present disclosure provide a method of performing a dynamics simulation of a Fermionic system, using a quantum information processing system comprising a plurality of trapped ions, each trapped ion defining a qubit. The method includes computing, by a processor, quantum circuits that implement one-body Trotter terms and two-body Trotter terms of a time evolution operator of a Fermionic system to be simulated, on a plurality of qubits, compressing, by the processor, a quantum circuit that implements a two-body Trotter term on a first qubit, a second qubit, a third qubit, and a fourth qubit in a selected state, wherein in the selected state, the first and second qubits are in the same qubit state, and the third and fourth qubits are in the same qubit state, implementing, by an optical controller, the compressed quantum circuits on the plurality of qubits, measuring, by an imaging system, a qubit state of each of the plurality of qubits at a first time, and outputting, by the processor, an indication of the measured qubit states of the plurality of qubits at the first time, the indication illustrating a time evolution of the Fermionic system at the first time.

Embodiments of the present disclosure also provide a method of performing an estimation of a ground state energy of a Fermionic system using a quantum information processing system comprising a plurality of trapped ions, each trapped ion defining a qubit. The method includes preparing, by an optical controller, a plurality of qubits in a first ansatz state, computing, by a processor, quantum circuits that implement one-body Trotter terms and two-body Trotter terms of a parametrized unitary ansatz evolution operator of a Fermionic system, on the plurality of qubits, compressing, by the processor, a quantum circuit that implements a two-body Trotter term on a first qubit, a second qubit, a third qubit, and a fourth qubit in a selected state, wherein in the selected state, the first and second qubits are in the same qubit state, and the third and fourth qubits are in the same qubit state, implementing, by the optical controller, the compressed quantum circuits on the plurality of qubits, measuring, by an imaging system, a qubit state of each of the plurality of qubits, and outputting, by the processor, an indication of the measured qubit states of the plurality of qubits, the indication illustrating a first energy of the Fermionic system.

Embodiments of the present disclosure further provide a non-transitory computer readable medium having instructions stored therein. The instructions, when executed by a processor, cause the processor to compute, by a processor, quantum circuits that implement one-body Trotter terms and two-body Trotter terms of an evolution operator of a Fermionic system, on a plurality of qubits, each qubit comprising a trapped ion, compress, by the processor, a quantum circuit that implements a two-body Trotter term on a first qubit, a second qubit, a third qubit, and a fourth qubit in a selected state, wherein in the selected state, the first and second qubits are in the same qubit state, and the third and fourth qubits are in the same qubit state, implement, by an optical controller, the compressed quantum circuits on the plurality of qubits, measure, by an imaging system, a qubit state of each the plurality of qubits, and output, by the processor, an indication of the measured qubit states of the plurality of qubits.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 depicts a flowchart illustrating a method of performing a Hamiltonian dynamics simulation of a Fermionic system on a quantum information processing system.

FIG. 10 depicts a flowchart illustrating a method of performing an estimation of a ground state energy of a Fermionic system on a quantum information processing system.

DETAILED DESCRIPTION

Figures 1, 2, 3:
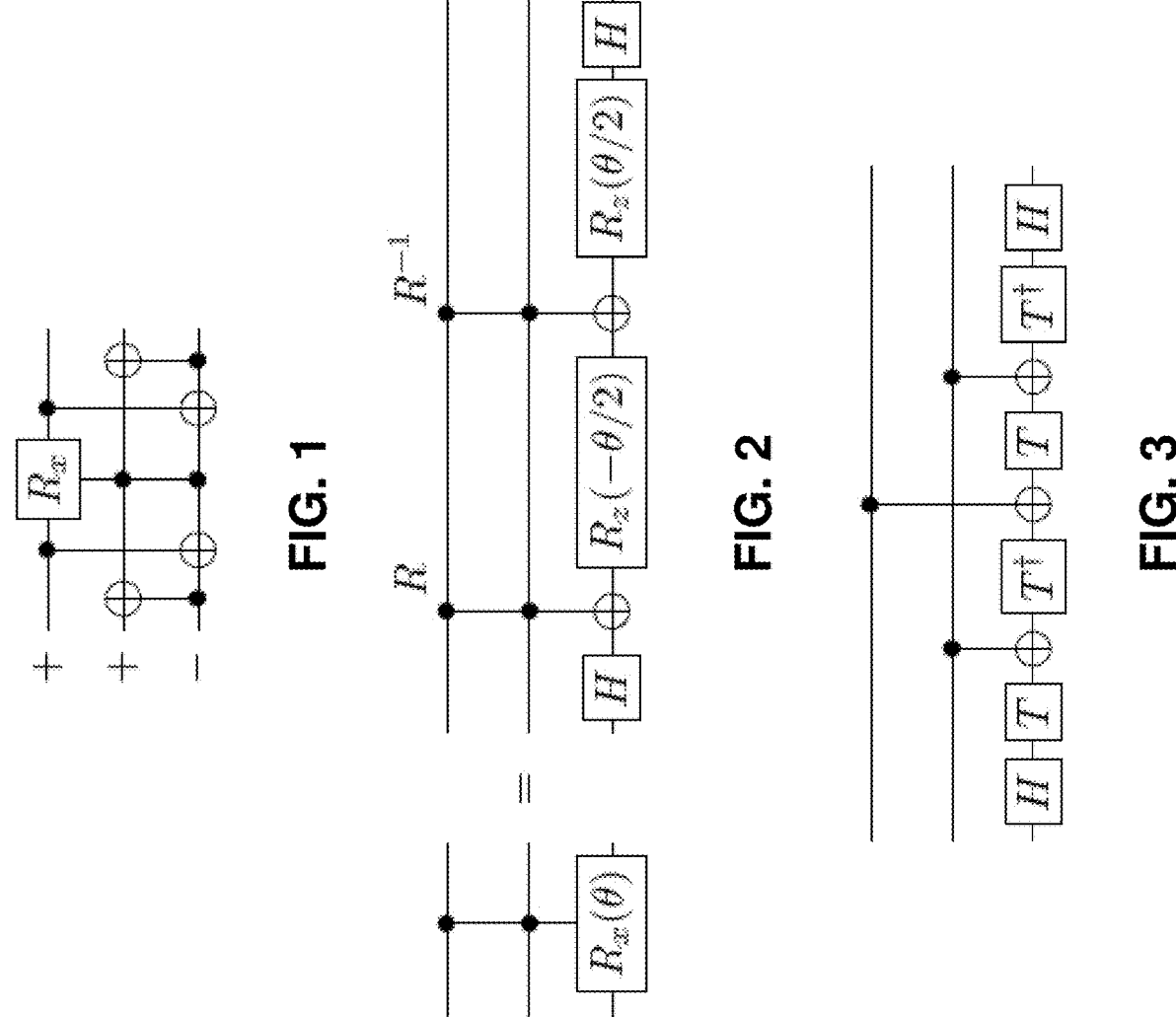
FIG. 1 is a diagram illustrating an example of a hybrid two-body interaction circuit according to some aspects of the present disclosure.
FIG. 2 is a diagram illustrating an example of a doubly-controlled $R_x(\theta)$ gate implementation with relative-phase doubly-controlled not gates.
FIG. 3 illustrates examples of quantum circuits and optimized constructions according to some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

In the embodiments described herein, methods and systems for quantum simulation of a Fermionic system on a quantum computer, using two approaches: a Hamiltonian dynamics simulation, and a variational ground state energy estimation. The Hamiltonian dynamics simulation is suitable for a fault-tolerant (FT) quantum computer, and based on quantum simulation algorithms, using the product-formula (PF) algorithm and multiple generalized transformation of Fermionic operators to qubit operators. The variational ground state energy estimation is suitable for an imperfect, pre-fault tolerant (pre-FT) quantum computer, and based on variational quantum-classical hybrid approach, such as the variational quantum eigensolver (VQE) using a unitary coupled cluster (UCC) ansatz.

In some implementations, results of the Hamiltonian dynamics simulation may be utilized in chemical, pharmaceutical, physical, and other applications. The simulation may be real-time. In some implementations, results of the variational ground state estimation may be utilized to compute the ground states of particles. The ground states of the particles may be used for determining chemical reactions, bonding properties, energetic states.

In both approaches, quantum circuits that implement the quantum simulation are optimized. The cost functions considered for optimization include me number or $$ T := \begin{pmatrix} 1 & 0 \\ 0 & e^{i\pi/4} \end{pmatrix} $$

gates, and the number of qubits when the PF algorithm is used, in the Hamiltonian dynamics simulation, and the number of two-qubit gates and the number of qubits in the variational ground state energy estimation.

I. Quantum Information Processing (QIP) Systems

As described above, trapped ions may be used to implement qubits used in quantum information processing (QIP) systems. A typical ion trap geometry or structure used for quantum information and metrology purposes is the linear radio frequency (RF) Paul trap (also referred to as an RF trap or simply a Paul trap), where nearby electrodes hold static and dynamic electrical potentials that lead to a confinement of the ions. Qubits based on trapped ions may be used as different types of devices, including but not limited to quantum memories, quantum gates in quantum computers and simulators, and nodes for quantum communication networks.

As used in this disclosure, the terms "atoms" and "neutral atoms" may be interchangeable, while the terms "ions" and "atomic ions" may be interchangeable. Moreover, the terms "atomic ions," "ions," "atoms," and "neutral atoms" may describe the particles that are generated from a source material and that are to be confined or trapped, or are actually confined or trapped, in a trap to form a crystal, lattice, or similar arrangement or configuration. The term "plasma" may describe a flux of neutral atoms, ions, or both.

II. Simulation of Fermionic System

In the described herein, two methods of quantum simulation of a Fermionic system on a quantum computer are provided: a Hamiltonian dynamics simulation, suitable for a fault-tolerant (FT) quantum computer, and a ground state energy estimation, suitable for an imperfect, pre-fault tolerant (pre-FT) quantum computer.

II. A Fermionic System

In one implementation, a Fermionic system evolves according to a time-independent, local, second-quantized Hamiltonian H in the occupation basis $$H = \sum_{p,q} h_{pq} a_p^\dagger a_q + \sum_{p,q,r,s} h_{pqrs} a_p^\dagger a_q^\dagger a_r a_s, \tag{1}$$

where $$a_p^\dagger$$

denote the Fermionic creation and annihilation operators on the p-th and q-th levels, respectively, and $h_{pq}$ and $h_{pqrs}$ denote single- and double-Fermion Hamiltonian coefficients, respectively. The Fermionic operators follow the canonical anti-commutation relations $$\{a_j, a_k\} = 0, \{a_j^\dagger, a_k^\dagger\} = 0, \{a_j, a_k^\dagger\} = \delta_{j,k} 1, \tag{2}$$

where {A,B} denotes the anticommutator {AB+BA}, $\delta_{jk}$ is a Kronecker delta, and 1 is an identity operator. For the implementations on a quantum computer, the Fermionic operators may be transformed using the Jordan-Wigner (JW) transformation, defined for a n-qubit system according to $$a_j^\dagger = 1^{\otimes n-j-1} \otimes \sigma_+ \otimes \sigma_z^{\otimes j}, a_j = 1^{\otimes n-j-1} \otimes \sigma_- \otimes \sigma_z^{\otimes j}, \tag{3}$$

where $j \in [0, n-1]$, $\otimes$ denotes the tensor product, $$\sigma_+ := \begin{pmatrix} 0 & 0 \\ 1 & 0 \end{pmatrix}, \sigma_- := \begin{pmatrix} 0 & 1 \\ 0 & 0 \end{pmatrix}, \text{ and } \sigma_z := \begin{pmatrix} 1 & 0 \\ 0 & -1 \end{pmatrix}.$$

In some instances, the transformation of the Fermionic operations to qubit operators may use other transformation, such as Jordan-Wigner (JW) or Bravyi-Kitaev (BK), or any other transformations known in the art. Depending on the transformation, quantum resource requirements, such as the number of two-qubit gates and/or the number of qubits required for implementing quantum simulation, may be reduced.

II. B Hamiltonian Dynamics Simulation of Fermionic System

In the Hamiltonian dynamics simulation, the evolution operator $U_{evo} = e^{iHt}$, by which the Fermionic system evolves forward in time for time, is implemented on a quantum computer, where H is the system Hamiltonian.

Implementation of the evolution operator $U_{evo}$ may use the technique of the 2k-th order product formula (PF), which may result in a more efficient quantum circuit in practice. After the JW transformation has been performed on the Hamiltonian H in equation (1), the time evolution operator $U_{evo} = e^{iHt}$ may be written as $$\exp\left[-i\left(\sum_{j=1}^{L} \theta_j \hat{\sigma}^{(j)}\right)\right] \approx [S_{2k}(\lambda)]^r, \tag{4}$$

where $\lambda := 1/r$, $\hat{\sigma}^{(j)} = \otimes_i \tilde{\sigma}^{(i,j)} + h.c.$, where $\tilde{\sigma}\{\sigma_+, \sigma_-, \sigma_z\}$ and h.c. denotes the Hermitian conjugate operator, and $$S_1(\lambda) := \prod_{j=1}^{L} \exp\left(-i\theta_j \hat{\sigma}^{(j)} \lambda\right), \tag{5}$$

$$S_2(\lambda) := \prod_{j=1}^{L} \exp\left(-i\theta_j \hat{\sigma}^{(j)} \lambda/2\right) \prod_{j=L}^{1} \exp\left(-i\theta_j \hat{\sigma}^{(j)} \lambda/2\right),$$

$$S_{2k}(\lambda) := [S_{2k-2}(p_k\lambda)]^2 S_{2k-2}((1-4p_k)\lambda)[S_{2k-2}(p_k\lambda)]^2,$$

with $p_k := 1/(4-4^{1/(2k-1)})$ for k>1. The individual exponential terms, hereafter referred to as a Trotter term, are of the form $\exp[-i\theta'_i(\otimes_i + h.c.)]$, where $\theta'_j$ is a suitably scaled $\theta_j$.

Optimized Circuits for Trotter Term Implementation in FT Quantum Computer

As shown above, in the Hamiltonian dynamics simulation, quantum circuits that implement Trotter terms of the time evolution operator $U_{evo} = e^{iHt}$ on a quantum computer are compiled (e.g., the Trotter terms are converted into quantum circuits), and then optimized. Quantum circuits are optimized such that the number of $$T := \begin{pmatrix} 1 & 0 \\ 0 & e^{i\pi/4} \end{pmatrix}$$

gates and the number of qubits required for the implementation of the Trotter terms are minimized.

An optimized circuit that implements a two-body Trotter term $\exp[-i\theta(\sigma_+\sigma_+\sigma_-\sigma_-+h.c.)]$ can be synthesized by the method described in detail in the U.S. application Ser. No. 17/177,813 (entitled "Methods and apparatuses for resource-optimized Fermionic local simulation on quantum computer for quantum chemistry") which is incorporated by reference herein. An optimized circuit that implements the two-body Trotter term $\exp[-i\theta(\sigma_+\sigma_+\sigma_-\sigma_-+h.c.)]$ can be synthesized by a triply-controlled $R_x(\theta')$: $=\exp(-i\theta'\sigma_x/2)$ gate (also referred to as a "triply-controlled-X gate"), where $\sigma_x=\sigma_+ + \sigma_-$, conjugated by an appropriate network of controlled-NOT gates, where $$\text{NOT} := \begin{pmatrix} 0 & 1 \\ 1 & 0 \end{pmatrix}.$$

In certain instances, the two-body Trotter term $\exp[-i\theta\sigma_+\sigma_+\sigma_-\sigma_-+\text{h.c.})]$ implements an operation on the input state $c_{00,00}|0000\rangle+c_{00,11}|0011\rangle+c_{11,00}|1100\rangle+c_{11,11}|1111\rangle$. Redundant information encoded between a first set of two qubits and a second set of two qubits can be leveraged to enable circuit optimization. For instance, a one-body Trotter term $\exp[-i\theta(\sigma_+\sigma_-+\text{h.c.})]$ can be used on a first qubit of the first set and a first qubit of the second set to implement the two-body Trotter term, up to a conjugation by controlled-NOT gates, conditioned on the first qubit of the first set and the first qubit of the second set, targeted on a second qubit of the first set and a second qubit of the second set, that compresses and uncompresses the redundant information. One with the ordinary skill in the art would readily know that the choice of a first qubit and a second qubit in the first and the second sets can be arbitrary.

An optimized circuit that implements the one-body Trotter term $\exp[-i\theta(\sigma_+\sigma_-+\text{h.c.})]$ can be synthesized by the method described in detail in the U.S. application Ser. No. 17/177,813 (entitled "Methods and apparatuses for resource-optimized Fermionic local simulation on quantum computer for quantum chemistry") which is incorporated by reference herein. An optimized circuit that implements the one-body Trotter term $\exp[-i\theta(\sigma_+\sigma_-+\text{h.c.})]$ can be synthesized by a singly-controlled $R_x(\theta')$ gate (also referred to as a "singly-controlled X gate"), conjugated by an appropriate network of controlled-NOT gates.

In certain instances, the two-body Trotter term $\exp[-i\theta(\sigma_+\sigma_+\sigma_-\sigma_-+\text{h.c.})]$ implements an operation on the input state $c_{00,00}|0000\rangle+c_{00,11}|0011\rangle+c_{01,00}|0100\rangle+c_{01,11}|0111\rangle+c_{10,00}|1000\rangle+c_{10,11}|1011\rangle+c_{11,00}|1100\rangle 1100\rangle+c_{11,11}|1111\rangle$. Redundant information encoded in a second set of two qubits can be leveraged to enable circuit optimization. For instance, a hybrid Trotter term between one- and two-body Trotter terms $\exp[-i\theta(\sigma_+\sigma_+\sigma_-+\text{h.c.})]$ can be used on a first set of two qubits and a first qubit of a second set, up to a conjugation by a controlled-NOT gate, conditioned on the first qubit of the second set, targeted on a second qubit of the second set, that compresses and uncompresses the redundant information. One with the ordinary skill in the art would readily know that the choice of a first qubit and a second qubit in the second set can be arbitrary.

An optimized circuit that implements the hybrid Trotter term $\exp[-i\theta(\sigma_+\sigma_+\sigma_-+\text{h.c.})]$ can be synthesized by a doubly-controlled $R_x(\theta')$ gate (also referred to as a "doubly-controlled X gate"), conjugated by an appropriate network of controlled-NOT gates, as shown in FIG. 1.

A doubly-controlled $R_x$ gate in FIG. 1 can be implemented using single- and/or two-qubit gates. For example, the doubly-controlled $R_x$ gate may be implemented with Hadamard $$H := \frac{1}{\sqrt{2}}\begin{pmatrix} 1 & 1 \\ 1 & -1 \end{pmatrix}$$

gates, $$R_z := \begin{pmatrix} e^{-i\frac{\theta}{2}} & 0 \\ 0 & e^{i\frac{\theta}{2}} \end{pmatrix}$$

gates, and/or doubly-controlled NOT gates. In one implementation, the doubly-controlled NOT gates may be relative phase doubly-controlled NOT gates, as shown in FIG. 2.

A relative phase doubly-controlled NOT gate can be implemented using single- and/or two-qubit gates. For example, the doubly-controlled NOT gate may be implemented with Hadamard H gate, T gates, and singly-controlled NOT gates, as shown in FIG. 3.

Figures 4, 5, 6:
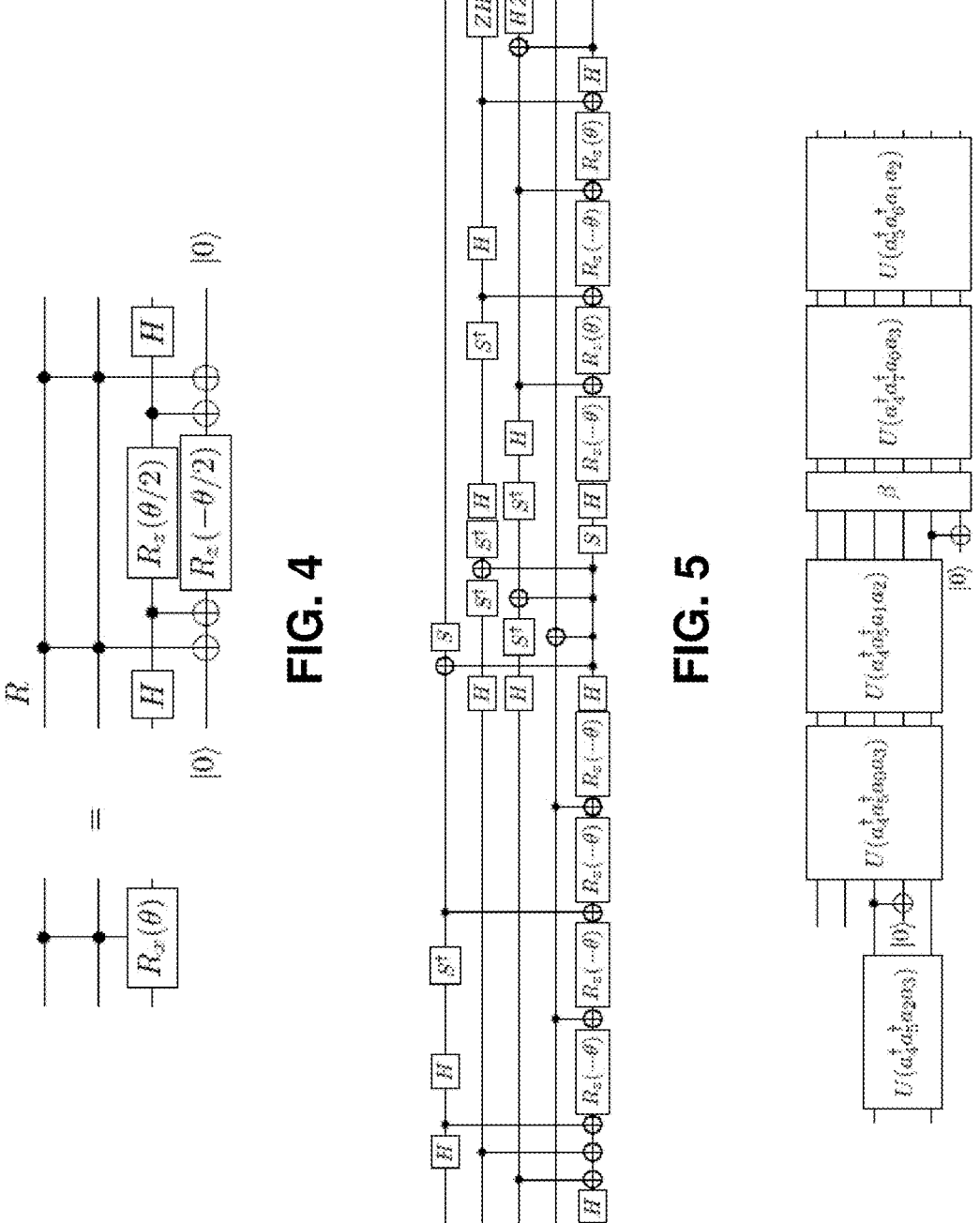
FIG. 4 is a diagram illustrating an example of a doubly-controlled $R_x(\theta)$ gate implementation with relative-phase doubly-controlled not gates and an ancilla qubit.
FIG. 5 is a diagram illustrating an example circuit of a pair of hybrid two-body interactions according to some aspects of the present disclosure.
FIG. 6 is a diagram illustrating an example circuit of multiple two-body interactions according to some aspects of the present disclosure.

In some aspects of the present disclosure, the Trotter term above may be implemented using $|0\rangle$-state initialized ancilla qubit as shown in FIG. 4. A circuit shown in FIG. 4 may require $R_z$ depth of one per two-body Trotter term. A circuit shown in FIG. 1, implemented using a doubly-controlled $R_x$ gate as shown in FIG. 2 or FIG. 4 with relative phase doubly-controlled NOT gates as shown in FIG. 3 decreases the T gate count per two-body Trotter term from 16 to eight.

II. C Variational Ground-State Energy Estimation

In the variational ground state energy estimation, the ground state energy of the system whose Hamiltonian H is given by equation (1) may be calculated, for example, by the variational quantum eigensolver (VQE), where an ansatz state is created on a quantum computer to evaluate the energy of the ansatz state. In the VQE approach, by iteratively calling the quantum computer to compute the energies of the parametrized ansatz states, the energy may be minimized (locally or globally) to obtain the ground state of the target system.

In the variational ground state energy estimation, a certain type of ansatz states $\Psi_{ansatz}$ may be generated from an initial state $\Psi_0$ using a parametrized unitary ansatz evolution operator $\Psi_{ansatz}$, as $\Psi_{ansatz}=U_{ansatz}\Psi_0$. The parametrized unitary ansatz evolution operator $U_{ansatz}$ may be in an exponential form $e^{Z-Z^\dagger}$, where Z is parametrized. By varying the parameters in Z, the ansatz state energy $\langle\Psi_{ansatz}|H|\Psi_{ansatz}\rangle=\langle\Psi_0|U^\dagger HU|\Psi_0\rangle$ may be variationally minimized.

In some implementations, the initial state may be a ground state Hartree-Fock (HF) wavefunction $|\Psi_0\rangle$ that may be calculated on a classical computer and implemented on a quantum computer. Subsequently, the wavefunction $|\Psi_0\rangle$ may be evolved with a parametrized unitary ansatz evolution operator $U_{ansatz}$. In one example, the unitary ansatz evolution operator $U_{ansatz}$ may be $$e^{Z_{UCCSD}-Z^\dagger_{UCCSD}},$$

using the unitary coupled cluster singles and doubles (UCCSD) ansatz, where $$Z_{UCCSD} = \sum_{l=1}^{2} Z_l$$

and $Z_l$ may be the l-body excitation operators. The one- and two-body excitation operators $Z_1$ and $Z_2$ may be written in second-quantized form as $$Z_1=\Sigma_{p\in vir,r\in occ}t_{pr}\alpha_p^\dagger a_r,$$

$$Z_2=\Sigma_{p\in virt,r\in occ}t_{pqrs}\alpha_p^\dagger a_q^\dagger \alpha_r\alpha_s, \qquad (6)$$

where $t_{pr}$ and $t_{pqrs}$ are variational parameters and "virt" and "occ" denote virtual and occupied levels, respectively. The one- and two-body excitation operators $Z_1$ and $Z_2$ may be transformed using the JW transformation to qubit operators, and may be written as a sum of one- and two-body Trotter terms. To minimize the size of the circuit that implements the parametrized unitary ansatz evolution operator $U_{ansatz}$, only a subset of all the parameters $t_{pq}$ and $t_{pqrs}$ may be considered. In certain implementations, a first-order PF algorithm may be used to implement the ansatz.

Optimized Circuits for Trotter Term Implementation in Pre-FT Quantum Computer As shown above, in the variational ground state estimation, implementation requires circuits that implement Trotter terms of the parametrized unitary ansatz evolution operator $U_{ansatz}$ on a quantum computer. Circuits are optimized such that the number of qubits required for the implementation of the Trotter terms are minimized.

A standard circuit that implements a two-body Trotter term in $U_{ansatz}$ using the JW transformation may be well known in the art. An optimized implementation of a two-body Trotter term exp $[i\theta(\sigma_+\sigma_+\sigma_-\sigma_--h.c.)]$ for the pre-FT regime can be synthesized by the method described in detail in the U.S. Ser. No. 11/010,517 (entitled "Methods and apparatuses for two-qubit gate reduction in quantum circuits") which is incorporated by reference herein. An optimized circuit that implements the two-body Trotter term exp $[i\theta(\sigma_+\sigma_+\sigma_-\sigma_--h.c.)]$ can be synthesized with 13 controlled-NOT gates.

In certain instances, the two-body Trotter term exp $[i\theta(\sigma_+\sigma_+\sigma_-\sigma_--h.c.)]$ implements an operation on the input state $c_{00,00}|0000\rangle + c_{00,11}|0011\rangle + c_{11,00}|1100\rangle + c_{11,11}|1111\rangle$. Redundant information encoded between a first set of two qubits and a second set of two qubits can be leveraged to enable circuit optimization. For instance, a one-body Trotter term exp $[i\theta(\sigma_+\sigma_--h.c.)]$ can be used on a first qubit of the first set and a first qubit of the second set to implement the two-body Trotter term, up to a conjugation by controlled-NOT gates, conditioned on the first qubit of the first set and the first qubit of the second set, targeted on a second qubit of the first set and a second qubit of the second set, that compresses and uncompresses the redundant information. One with the ordinary skill in the art would readily know that the choice of a first qubit and a second qubit in the first and the second sets can be arbitrary.

An optimized circuit that implements the one-body Trotter term exp $[i\theta(\sigma_+\sigma_--h.c.)]$ can be synthesized by the method described in detail in the U.S. Ser. No. 11/010,517 (entitled "Methods and apparatuses for two-qubit gate reduction in quantum circuits") which is incorporated by reference herein. An optimized circuit that implements the one-body Trotter term exp $[i\theta(\sigma_+\sigma_--h.c.)]$ can be synthesized by two XX($\theta'$): =exp $(-i\theta'\sigma_x\sigma_x/2)$ gates and single-qubit gates.

In certain instances, the two-body Trotter term exp $[i\theta(\sigma_+\sigma_+\sigma_-\sigma_--h.c.)]$ implements an operation on the input state $c_{00,00}|0000\rangle + c_{00,11}|0011\rangle + c_{01,00}|0100\rangle + c_{01,11}|0111\rangle + c_{10,00}|1000\rangle + c_{10,11}|1011\rangle + c_{11,00}|1100\rangle + c_{11,11}|1111\rangle$. Redundant information encoded in a second set of two qubits can be leveraged to enable circuit optimization. For instance, a hybrid Trotter term between one- and two-body terms exp $[i\theta(\sigma_+\sigma_+\sigma_--h.c.)]$ can be used on a first set of two qubits and a first qubit of a second set, up to a conjugation by a controlled-NOT gate, conditioned on that first qubit of the second set, targeted on a second qubit of the second set, that compresses and uncompresses the redundant information. One with the ordinary skill in the art would readily know that the choice of a first qubit and a second qubit in the second set can be arbitrary.

In some instances, hybrid Trotter terms may be implemented in a pair. In one example, a six-qubit circuit may be considered, where the two terms in a pair to be considered are of the form exp $$[i\theta(a_4^\dagger a_5^\dagger a_0 a_3 - h.c.)]$$

and exp $$[i\theta(a_4^\dagger a_5^\dagger a_1 a_2 - h.c.)],$$

prior to the JW transformation, and the input state considered is of the form $$c_{00,0000}|000000\rangle + c_{00,0001}|000001\rangle + c_{00,0010}|000010\rangle + c_{00,0011}|000011\rangle +$$

$$c_{00,0100}|000100\rangle + c_{00,0101}|000101\rangle + c_{00,0111}|000111\rangle + c_{00,1001}|001001\rangle +$$

$$c_{001010,}|001010\rangle + c_{00,1011}|001011\rangle + c_{00,1100}|001100\rangle + c_{00,1101}|001101\rangle +$$

$$c_{00,1111}|001111\rangle$$

$$c_{11,0000}|110000\rangle + c_{11,0001}|110001\rangle + c_{11,0010}|110010\rangle + c_{11,0011}|110011\rangle +$$

$$c_{11,0100}|110100\rangle$$

$$c_{11,0101}|110101\rangle + c_{11,0111}|110111\rangle + c_{11,1000}|111000\rangle + c_{11,1001}|111001\rangle +$$

$$c_{11,1010}|111010\rangle$$

$$c_{11,1011}|111011\rangle + c_{11,1100}|111100\rangle + c_{11,1101}|111101\rangle + c_{11,1111}|111\rangle.$$

An optimized circuit that implements a pair of hybrid Trotter terms for the example described above, as shown in FIG. 5, can be synthesized using 16 controlled-NOT gates, reducing from 30 controlled-NOT gates for a standard construction.

An optimized circuit that implements $U_{ansatz}$ using a single transformation can be synthesized by the method described in detail in the U.S. Ser. No. 11/010,517 (entitled "Methods and apparatuses for two-qubit gate reduction in quantum circuits") which is incorporated by reference herein. In some aspects of the present disclosure, multiple transformations are considered for $U_{ansatz}$, carefully chosen to optimize quantum circuits. Details of the multiple transformation, hereafter referred to as $\beta$, enabled circuit optimization are discussed below.

In one example, an upper-triangular basis-transformation matrix may be considered for $\beta$:

$$\beta = \begin{bmatrix} \beta_{n-1,n-1} & \beta_{n-1,n-2} & \cdots & \beta_{n-1,0} \\ 0 & \beta_{n-2,n-2} & \cdots & \beta_{n-2,0} \\ \vdots & \vdots & & \vdots \\ 0 & 0 & \cdots & \beta_{\beta 0,0} \end{bmatrix} \quad (7)$$

where $\beta_{i,j} \in \{0,1\}$ for $i>j$, $\beta_{i,j}\beta_{i,j}=1$, and n is the number of qubits involved in the transformation. The following sets of indices can then be defined, where all matrix operations are performed in modulo-2 space and the main diagonal elements are excluded when generating these sets:

Update set (j): elements of this set are the row indices with non-zero entries in column j of the basis-transformation matrix β.

Parity set P(j): elements of this set are the column indices with non-zero entries in row j of the matrix $\pi\beta^{-1}-\beta^{-1}$, where $\pi_{i,j=1}$ if i≤j, otherwise 0.

Remainder set RU): elements of this set are the column indices with non-zero entries in row j of the matrix $\pi\beta^{-1}$.

The β-based creation and annihilation operators are $$\alpha_j^\dagger=[\sigma_x^{U(j)}\otimes\sigma_x^j\otimes\sigma_z^{P(j)}-i\sigma_x^{U(j)}\otimes\sigma_y^j\otimes\sigma_z^{R(j)}]/2,$$

$$\alpha_j=[\sigma_x^{U(j)}\otimes\sigma_x^j\otimes\sigma_z^{P(j)}+i\sigma_x^{U(j)}\otimes\sigma_y^j\otimes\sigma_z^{R(j)}]/2, \qquad (8)$$

It should be noted that any choice of β is allowed for each Trotter term implementation. Following the heuristic methods discussed in detail in the U.S. Ser. No. 11/010,517 (entitled "Methods and apparatuses for two-qubit gate reduction in quantum circuits") an optimal choice of β for individual Trotter terms may be found to reduce the number of multi-qubit gates. It should be further noted that a transition from one β to the next incurs non-zero multi-qubit gates. Thus, there is a competition between the optimization achieved by the use of individualized β for different Trotter terms and the overhead incurred by the transition between different β. One with ordinary skills in the art would readily know that optimization over the competition can be achieved using standard optimizers known in the art.

A non-limiting example that uses multiple β is schematically shown in FIG. 6. $U_{ansatz}$ considered is a sequence of $U(\alpha_p^\dagger\alpha_q^\dagger\alpha_r\alpha_s)$: $=\exp[it_{pqrs}(\alpha_p^\dagger\alpha_q^\dagger\alpha_r\alpha_s-\text{h.c.})]$. Each $(\alpha_p^\dagger\alpha_q^\dagger\alpha_r\alpha_s)$ can be implemented different β matrices. In this example the first three $(\alpha_p^\dagger\alpha_q^\dagger\alpha_r\alpha_s)$ operators are implemented with β=1 and the latter two are implemented with β≠1.

Further, in FIG. 6, three different classes of $(\alpha_p^\dagger\alpha_q^\dagger\alpha_r\alpha_s)$ implementations are shown. The first is implemented in the one-body regime. The subsequent two are implemented in the hybrid regime between one- and two-body regimes. The last two are implemented in the two-body regime. Controlled-NOT gates that appear in FIG. 6 correspond to the un-compression step discussed above. The compression counterpart step is not shown since the current example admits an optimization over the compression step by the use of a classical computer, using readily known optimization steps to those with ordinary skills in the art.

III. QIP SYSTEM

Figure 7:
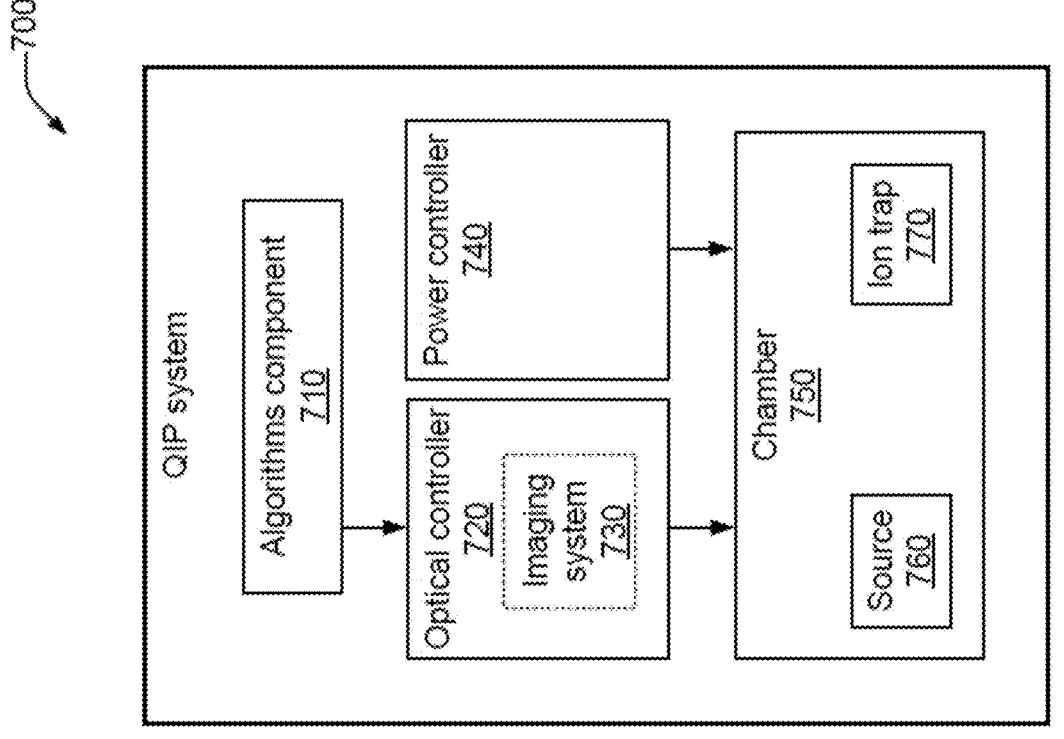
FIG. 7 is a block diagram that illustrates an example of a quantum information processing (QIP) system according to some aspects of the present disclosure.

FIG. 7 is a block diagram that illustrates an example of a QIP system 700 in accordance with aspects of this disclosure. The QIP system 700 may also be referred to as a quantum computing system, a computer device, a trapped ion system, or the like.

The QIP system 700 can include a source 760 that provides atomic species (e.g., a plume or flux of neutral atoms) to a chamber 750 having an ion trap 770 that traps the atomic species once ionized (e.g., photoionized). In one example, a power controller 740 may supply the electrical energy used by the source 760 to generate an atomic flux.

The imaging system 730 can include a high resolution imager (e.g., CCD camera) for monitoring the atomic ions and measuring a qubit state of each of the atomic ions, while they are being provided to the ion trap or after they have been provided to the ion trap 770. In an aspect, the imaging system 730 can be implemented separate from the optical controller 720. However, the use of fluorescence to detect, identify, and label atomic ions using image processing algorithms may need to be coordinated with the optical controller 720.

The QIP system 700 may also include an algorithms component 710 that may operate with other parts (not shown) of the QIP system 700 to perform quantum algorithms or quantum operations, including a stack or sequence of combinations of single qubit operations and/or multi-qubit operations (e.g., two-qubit operations) as well as extended quantum computations. As such, the algorithms component 710 may provide instructions to various components of the QIP system 700 (e.g., to the optical controller 720) to enable the implementation of the quantum algorithms or quantum operations.

IV. Computer Device

Figure 8:
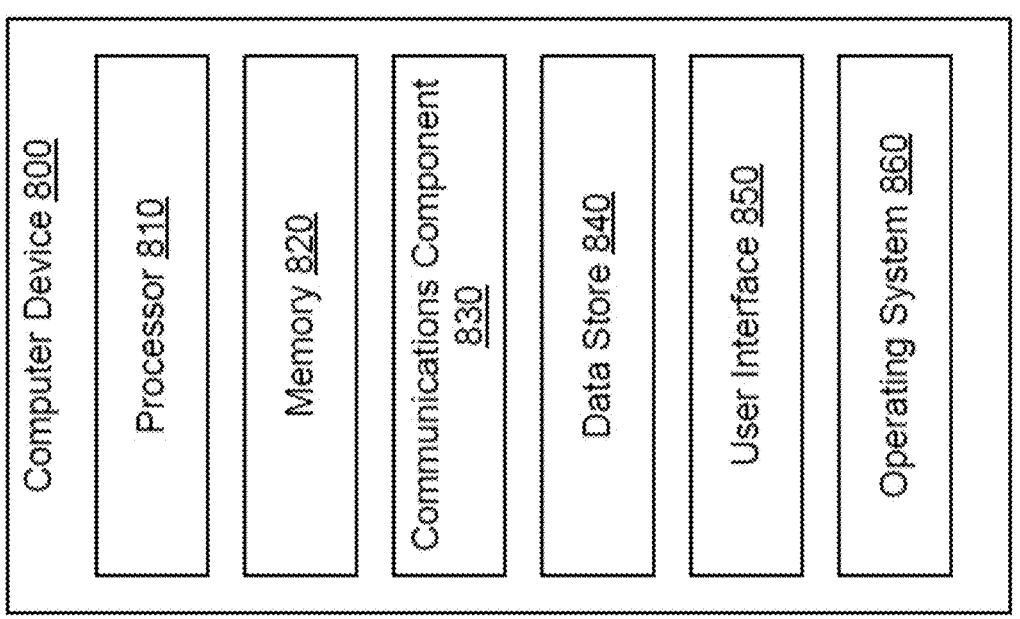
FIG. 8 is a diagram that illustrates an example of a computer device according to some aspects of the present disclosure.

Referring now to FIG. 8, illustrated is an example computer device 800 in accordance with aspects of the disclosure. The computer device 800 may represent a computing device, multiple computing devices, or a distributed computing system, for example. The computer device 800 may be configured as a quantum computer (e.g., a quantum information processing (QIP) system), a classical computer, or a combination of quantum and classical computing functions. For example, the computer device 800 may be used to process information using quantum algorithms based on trapped ion technology and may therefore implement methods for performing, optimizing, compiling, and/or executing a quantum circuit as described above. A generic example of the computer device 800 as a QIP system that may implement the various techniques described herein is illustrated in an example shown in FIG. 7.

In one example, the computer device 800 may include a processor 810 for carrying out processing functions associated with one or more of the features described herein. The processor 810 may include a single or multiple set of processors or multi core processors. Moreover, the processor 810 may be implemented as an integrated processing system and/or a distributed processing system. The processor 810 may include a central processing unit (CPU), a quantum processing unit (CPU), a graphics processing unit (GPU), or combination of those types of processors. In one aspect, the processor 810 may refer to a general processor of the computer device 800, which may also include additional processors 810 to perform more specific functions such as functions for individual beam control.

In an example, the computer device 800 may include a memory 820 for storing instructions executable by the processor 810 for carrying out the functions described herein. In an implementation, for example, the memory 820 may correspond to a computer-readable storage medium that stores code or instructions to perform one or more of the functions or operations described herein. In one aspect of the present disclosure, the memory 820 may be a non-transitory computer-readable medium that stores code or instructions to perform one or more of the functions, techniques, and/or operations described herein. In one example, the memory 820 may include instructions to perform aspects of methods in accordance with the present disclosures. Just like the processor 810, the memory 820 may refer to a general memory of the computer device 800, which may also include additional memories 820 to store instructions and/or data for more specific functions such as instructions and/or data for individual beam control.

Further, the computer device 800 may include a communications component 830 that provides for establishing and maintaining communications with one or more parties utilizing hardware, software, and services as described herein. The communications component 830 may carry communications between components on the computer device 800, as well as between the computer device 800 and external devices, such as devices located across a communications network and/or devices serially or locally connected to computer device 800. For example, the communications component 830 may include one or more buses, and may further include transmit chain components and receive chain components associated with a transmitter and receiver, respectively, operable for interfacing with external devices.

Additionally, the computer device 800 may include a data store 840, which may be any suitable combination of hardware and/or software, that provides for mass storage of information, databases, and programs employed in connection with implementations described herein. For example, the data store 840 may be a data repository for operating system 860 (e.g., classical OS, or quantum OS). In one implementation, the data store 840 may include the memory 820.

The computer device 800 may also include a user interface component 850 operable to receive inputs from a user of the computer device 800 and further operable to generate outputs for presentation to the user or to provide to a different system (directly or indirectly). The user interface component 850 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 850 may include one or more output devices, including but not limited to a display, a speaker, a haptic feedback mechanism, a printer, any other mechanism capable of presenting an output to a user, or any combination thereof.

In an implementation, the user interface component 850 may transmit and/or receive messages corresponding to the operation of the operating system 860. In addition, the processor 810 may execute the operating system 860 and/or applications or programs, and the memory 820 or the data store 840 may store them.

When the computer device 800 is implemented as part of a cloud-based infrastructure solution, the user interface component 850 may be used to allow a user of the cloud-based infrastructure solution to remotely interact with the computer device 800.

In some implementations, the computer device 800 may be implemented to perform classical computations, quantum computations, or both. The computer device 800 may be implemented as a classical computer, a quantum computer, or a hybrid classical-quantum computer.

In one aspect of the present disclosure, the techniques described above may be performed by a quantum computer, a classical computer, or a hybrid classical-quantum computer. For example, the techniques for simulating a quantum circuit, optimizing a quantum circuit, compiling a quantum circuit, and/or executing a quantum circuit may be implemented by the computer device 800.

In some aspects, the computer device 800 and/or one or more of the subcomponents of the computer device 800 may be configured to and/or define means for implementing the techniques described above.

V. Methods

In this section, two methods of quantum simulation of a Fermionic system on a quantum computer, the Hamiltonian dynamic simulation and the variational ground state energy estimation, are provided. The Hamiltonian dynamic simulation may be used on a fault-tolerant (FT) quantum computer, and the variational ground state energy estimation may be used on a pre-fault tolerant (pre-FT) quantum computer.

V. A Hamiltonian Dynamics Simulation of Fermionic System

FIG. 9 depicts a flowchart illustrating a method 900 of performing a Hamiltonian dynamics simulation of a Fermionic system on a quantum information processing system, such as the QIP system 700 shown in FIG. 7.

The method 900 begins with block 910, in which quantum circuits that implement one-body Trotter terms exp $[-i\theta(\sigma_+\sigma_-+\text{h.c.})]$ and two-body Trotter terms exp $[-i\theta(\sigma_+\sigma_+\sigma_-\sigma_-+\text{h.c.})]$ of a time evolution operator $U_{evo}=e^{iHt}$ of a Fermionic system to be simulated, on a plurality of qubits are computed by a processor, such as the processor 810 shown in FIG. 8. Here, H is the system Hamiltonian. A quantum circuit that implements a one-body Trotter term exp $[-i\theta(\sigma_+\sigma_-+\text{h.c.})]$ on a pair of qubits of the plurality of qubits comprises a singly-controlled X gate and a controlled-NOT gate on the pair of qubits of the plurality of qubits. A quantum circuit that implements a two-body Trotter term exp $[-i\theta(\sigma_+\sigma_+\sigma_-\sigma_-+\text{h.c.})]$ on the first, second, third, and fourth qubits comprises a triply-controlled-X and controlled-NOT gates on the first, second, third, and fourth qubits.

Quantum circuits that implement hybrid Trotter terms exp $[-i\theta(\sigma_+\sigma_+\sigma_-\sigma_-+\text{h.c.})]$ between one-body Trotter terms exp $[-i\theta(\sigma_+\sigma_-+\text{h.c.})]$ and two-body Trotter terms exp $[-i\theta(\sigma_+\sigma_+\sigma_-\sigma_-+\text{h.c.})]$ may also computed by the processor. Each quantum circuit that implements a hybrid Trotter term includes a doubly-controlled X gate.

In block 920, a quantum circuit that implements a two-body Trotter term exp $[-i\theta(\sigma_+\sigma_+\sigma_-\sigma_-+\text{h.c.})]$ on a first qubit, a second qubit, a third qubit, and a fourth qubit in a selected state, wherein in the selected state, the first and second qubits are in the same qubit state, and the third and fourth qubits are in the same qubit state are compressed by the processor. The selected state may be an input state $c_{00,00}|0000\rangle c_{00,11}|0011\rangle + c_{11,00}|1100\rangle + c_{11,11}|1111\rangle$. The compressed quantum circuit that implements a two-body term exp $[-i\theta(\sigma_+\sigma_+\sigma_-\sigma_-+\text{h.c.})]$ on the first, second, third, and fourth qubits in the selected state comprises a quantum circuit that implements a one-body Trotter term on the first and third qubits, a controlled-NOT gate on the first and second qubits, and a controlled-NOT gate on the second and fourth qubits.

In block 930, the computed quantum circuits on the plurality of qubits are implemented by an optical controller, such as the optical controller 720 shown in FIG. 7.

In block 940, a qubit state of the plurality of qubits is measured, by an imaging system at a time t, such as the imaging system 730 shown in FIG. 7.

In block 950, the measured states of the plurality of qubits, indicating a time evolution of the Fermionic system at the time t are outputted, by the processor.

V. B Variational Ground-State Energy Estimation of Fermionic System

FIG. 10 depicts a flowchart illustrating a method 1000 of performing an estimation of a ground state energy of a Fermionic system on a quantum information processing system, such as the QIP system 700 shown in FIG. 7.

The method 1000 begins with block 1010, in which a plurality of qubits are prepared in a first ansatz state, by an optical controller, such as the optical controller 720 shown in FIG. 7. In some embodiments, the first ansatz state is a ground state Hartree-Fock (HF) wavefunction $|\Psi_0\rangle$.

In block 1020, quantum circuits that implement one-body Trotter terms $\exp[-i\theta(\sigma_+\sigma_- - h.c.)]$ and two-body Trotter terms $\exp[-i\theta(\sigma_+\sigma_+\sigma_-\sigma_- - h.c.)]$ of a parametrized unitary ansatz evolution operator $U_{ansatz}$ of a Fermionic system, on a plurality of qubits are computed by a processor, such as the processor 810 shown in FIG. 8. A one-body Trotter term $\exp[-i\theta(\sigma_+\sigma_- - h.c.)]$ on a pair of qubits of the plurality of qubits comprises a singly-controlled X gate and a controlled-NOT gate on the pair of qubits of the plurality of qubits. A quantum circuit that implements a two-body Trotter term $\exp[-i\theta(\sigma_+\sigma_+\sigma_-\sigma_- - h.c.)]$ on the first, second, third, and fourth qubits comprises 13 controlled-NOT gates on the first, second, third, and fourth qubits.

Quantum circuits that implement hybrid Trotter terms $\exp[-i\theta(\sigma_+\sigma_+\sigma_- - h.c.)]$ between one-body Trotter terms $\exp[-i\theta(\sigma_+\sigma_- - h.c.)]$ and two-body Trotter terms $\exp[-i\theta(\sigma_+\sigma_+\sigma_-\sigma_- - h.c.)]$ are also computed by the processor. Each quantum circuit that implements a hybrid Trotter terms $\exp[-i\theta(\sigma_+\sigma_+\sigma_- - h.c.)]$ includes 30 controlled-NOT gates.

In block 1030, a quantum circuit that implements a two-body Trotter term $\exp[-i\theta(\sigma_+\sigma_+\sigma_-\sigma_-\ h.c.)]$ on a first qubit, a second qubit, a third qubit, and a fourth qubit in a selected state, wherein in the selected state, the first and second qubits are in the same qubit state, and the third and fourth qubits are in the same qubit state are compressed, by the processor. The selected state may be an input state $c_{00,00}|0000\rangle + c_{00,11}|0011\rangle + c_{11,00}|1100\rangle + c_{11,11}|1111\rangle$. The compressed quantum circuit that implements a two-body term $\exp[-i\theta(\sigma_+\sigma_+\sigma_-\sigma_- - h.c.)]$ on the first, second, third, and fourth qubits in the selected state comprises a quantum circuit that implements a one-body Trotter term on the first and third qubits, a controlled-NOT gate on the first and second qubits, and a controlled-NOT gate on the second and fourth qubits. A compressed quantum circuit that implements a hybrid Trotter terms $\exp[-i\theta(\sigma_+\sigma_+\sigma_-\sigma_- - h.c.)]$ includes 16 controlled-NOT gates.

In block 1040, the computed quantum circuits on the plurality of qubits are implemented by the optical controller.

In block 1050, a qubit state of each of the plurality of qubits is measured by an imaging system, such as the imaging system 730 shown in FIG. 7.

In block 1060, the measured qubit states of the plurality of qubits, indicating a first energy of the Fermionic system are outputted by the processor.

In the method 1000, blocks 1010-1050 are iteratively repeated to compute an energy of the Fermionic system based on the first ansatz state, such that the energy is minimized by varying parameters in the parametrized unitary ansatz evolution operator $U_{ansatz}$.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

The invention claimed is:

1. A method of using a quantum information processing system comprising a plurality of trapped ions, each trapped ion defining a qubit, the method comprising:

performing a dynamic simulation of a Fermionic system, comprising:

computing, by a processor, first quantum circuits that implement one-body Trotter terms and second quantum circuits that implement two-body Trotter terms of a time evolution operator of the Fermionic system on a plurality of qubits;

compressing, by the processor, the second quantum circuits, each of which implements a two-body Trotter term on a first qubit, a second qubit, a third qubit, and a fourth qubit of the plurality of qubits in a selected state, wherein in the selected state, the first and second qubits are in a first qubit state, and the third and fourth qubits are in a second qubit state;

implementing, by an optical controller, the computed first quantum circuits and the compressed second quantum circuits on the plurality of qubits; and measuring, by an imaging system, a qubit state of each of the plurality of qubits at a first time; and outputting, by the processor, an indication of the measured qubit state of each of the plurality of qubits at the first time, the indication illustrating a time evolution of the Fermionic system at the first time.

2. The method of claim 1, wherein each of the first quantum circuits comprises a singly-controlled X gate and a controlled-NOT gate on the pair of qubits of the plurality of qubits.

3. The method of claim 1, wherein each of the second quantum circuits comprises a triply-controlled-X and controlled-NOT gates on the first, second, third, and fourth qubits.

4. The method of claim 3, wherein each of the compressed second quantum circuit comprises a quantum circuit that implements a one-body Trotter term on the first and third qubits, a controlled-NOT gate on the first and second qubits, and a controlled-NOT gate on the second and fourth qubits.

5. The method of claim 1, further comprising:

computing, by the processor, third quantum circuits that implement hybrid Trotter terms between one-body Trotter terms and two-body Trotter terms, each of the third quantum circuits comprising a doubly-controlled X gate.

6. A method of performing an estimation of a ground state energy of a Fermionic system using a quantum information processing system comprising a plurality of trapped ions, each trapped ion defining a qubit, the method comprising:

performing a dynamic simulation of a Fermionic system, comprising:

preparing, by an optical controller, a plurality of qubits in a first ansatz state;

computing, by a processor, first quantum circuits that implement one-body Trotter terms and second quantum circuits that implement two-body Trotter terms of a parametrized unitary ansatz evolution operator of a Fermionic system, on the plurality of qubits;

compressing, by the processor, the second quantum circuits, each of which implements a two-body Trotter term on a first qubit, a second qubit, a third qubit, and a fourth qubit of the plurality of qubits in a selected state, wherein in the selected state, the first and second qubits are in a first qubit state, and the third and fourth qubits are in the same a second qubit state;

implementing, by the optical controller, the computed first quantum circuits and the compressed second quantum circuits on the plurality of qubits; and measuring, by an imaging system, a qubit state of each of the plurality of qubits; and outputting, by the processor, an indication of the measured qubit state of each of the plurality of qubits, the indication illustrating a first energy of the Fermionic system.

7. The method of claim 6, further comprising:

modifying, by the processor, the parametrized unitary ansatz evolution operator; and repeating the preparing of the plurality of qubits, the computing of the first quantum circuits and the second quantum circuits, the compressing of the second quantum circuits, the measuring of the qubit state of each of the plurality of qubits, and the outputting of an indication of the measured qubit state of each of the plurality of qubits, the indication illustrating a second energy of the Fermionic system, wherein the second energy is less than the first energy.

8. The method of claim 6, wherein each of the first quantum circuits comprises a singly-controlled X gate and a controlled-NOT gate on the pair of qubits of the plurality of qubits.

9. The method of claim 6, wherein each of the second quantum circuits comprises 13 controlled-NOT gates on the first, second, third, and fourth qubits.

10. The method of claim 9, wherein the compressed second quantum circuits comprises a quantum circuit that implements a one-body Trotter term on the first and third qubits, a controlled-NOT gate on the first and second qubits, and a controlled-NOT gate on the second and fourth qubits.

11. The method of claim 6, further comprising:

computing, by the processor, third quantum circuits that implement hybrid Trotter terms between one-body Trotter terms and two-body Trotter terms, each of the third quantum circuits comprising 30 controlled-NOT gates; and compressing, by the processor, the third quantum circuits.

12. A non-transitory computer readable medium having instructions stored therein that, when executed by a processor, cause the processor to:

simulate a dynamic simulation of a Fermionic system by:

computing, by a processor, first quantum circuits that implement one-body Trotter terms and second quantum circuits that implement two-body Trotter terms of an evolution operator of a Fermionic system, on a plurality of qubits, each qubit comprising a trapped ion;

compressing, by the processor, the second quantum circuits, each of which implements a two-body Trotter term on a first qubit, a second qubit, a third qubit, and a fourth qubit of the plurality of qubits in a selected state, wherein in the selected state, the first and second qubits are in a first qubit state, and the third and fourth qubits are in a second qubit state;

implementing, by an optical controller, the computed first quantum circuits and the compressed second quantum circuits on the plurality of qubits; and measuring, by an imaging system, a qubit state of each of the plurality of qubits; and output, by the processor, an indication of the measured qubit state of each of the plurality of qubits.

13. The non-transitory computer readable medium of claim 12, wherein the evolution operator of the Fermionic system is a time evolution operator of the Fermionic system, and the indication of the measured qubit state of each of the plurality of qubits is a time evolution of the Fermionic system.

14. The non-transitory computer readable medium of claim 12, wherein the evolution operator of the Fermionic system is a parametrized unitary ansatz evolution operator of the Fermionic system, and the indication of the measured qubit state of each of the plurality of qubits is a first energy of the Fermionic system.

15. The non-transitory computer readable medium of claim 14, further comprising instructions for preparing, by the optical controller, the plurality of qubits in a first ansatz state.

16. The non-transitory computer readable medium of claim 15, further comprising instructions for modifying, by the processor, the parametrized unitary ansatz evolution operator; and repeating the preparing of the plurality of qubits, the computing of the first quantum circuits and the second quantum circuits, the compressing of the second quantum circuits, the measuring of the qubit state of each of the plurality of qubits, and the outputting of an indication of the measured qubit state of each of the plurality of qubits, the indication illustrating a second energy of the Fermionic system, wherein the second energy is less than the first energy.

17. The non-transitory computer readable medium of claim 12, wherein each of the first quantum circuits comprises a singly-controlled X gate and a controlled-NOT gate on the pair of qubits of the plurality of qubits.

18. The non-transitory computer readable medium of claim 12, wherein each of the second quantum circuits comprises controlled-NOT gates on the first, second, third, and fourth qubits.

19. The non-transitory computer readable medium of claim 18, wherein the compressed second quantum circuit comprises a quantum circuit that implements a one-body Trotter term on the first and third qubits, a controlled-NOT gate on the first and second qubits, and a controlled-NOT gate on the second and fourth qubits.

20. The non-transitory computer readable medium of claim 15, further comprising instructions for computing, by the processor, the third quantum circuits.

* * * * *